(12) United States Patent
Watanabe

(10) Patent No.: US 8,931,574 B2
(45) Date of Patent: Jan. 13, 2015

(54) LUBRICATION STRUCTURE FOR WORKING DEVICE

(75) Inventor: Koji Watanabe, Numazu (JP)

(73) Assignee: Makita Corporation, Anjo-Shi (JP)

( * ) Notice: Subject to any disclaimer, the term of this patent is extended or adjusted under 35 U.S.C. 154(b) by 522 days.

(21) Appl. No.: 13/255,142

(22) PCT Filed: Feb. 3, 2010

(86) PCT No.: PCT/JP2010/051525
§ 371 (c)(1),
(2), (4) Date: Sep. 7, 2011

(87) PCT Pub. No.: WO2010/113540
PCT Pub. Date: Oct. 7, 2010

(65) Prior Publication Data
US 2011/0315416 A1    Dec. 29, 2011

(30) Foreign Application Priority Data

Mar. 31, 2009  (JP) .................................. 2009-086822

(51) Int. Cl.
*B25D 17/14* (2006.01)
*A01D 34/30* (2006.01)
(Continued)

(52) U.S. Cl.
CPC ................ *A01D 34/30* (2013.01); *B23D 49/00* (2013.01); *A01G 3/053* (2013.01); *F16H 57/0464* (2013.01); *F16H 57/0471* (2013.01); *F16H 21/22* (2013.01)
USPC ..................... 173/58; 30/369; 30/392; 30/393

(58) Field of Classification Search
CPC .... B23D 49/00; B23D 51/00; B23D 51/0015; B23D 49/005; B23D 15/007

USPC ........... 30/173, 392, 393, 369, 502, 208, 205, 30/241; 173/58
See application file for complete search history.

(56) References Cited

U.S. PATENT DOCUMENTS 5,673,871 A * 10/1997 Wrase ......................... 242/573.2
6,170,159 B1    1/2001 Kramer et al.
(Continued)

FOREIGN PATENT DOCUMENTS

CN        201096147 Y    8/2008
JP        A-10-136784    5/1998
(Continued)

OTHER PUBLICATIONS

International Search Report issued in International Application No. PCT/JP2010/051525 on Apr. 13, 2010 (with translation).
(Continued)

*Primary Examiner* — Thanh Truong
*Assistant Examiner* — Eduardo R Ferrero
(74) *Attorney, Agent, or Firm* — Oliff PLC

(57) ABSTRACT

A lubrication structure for a working machine is provided. A driven gear that engages with a driving gear connected to a driving source and rotates, is accommodated in a chamber in a case. An eccentric cam is provided on a surface of the driven gear, and connected to a coupling pin in a blade through a crank member. A fitting ring part is provided in one end of the crank member, and the eccentric cam is inserted into the fitting ring part so as to rotate relative to the fitting ring part. An annular groove is formed on the inner surface of the fitting ring part which faces the outer surface of the eccentric cam. The annular groove communicates with a first chamber via a first lubricating passageway and also communicates with a second chamber via a second lubricating passageway.

2 Claims, 6 Drawing Sheets

(51) Int. Cl.
*B23D 49/00* (2006.01)
*A01G 3/053* (2006.01)
*F16H 57/04* (2010.01)
*F16H 21/22* (2006.01)

(56) References Cited

U.S. PATENT DOCUMENTS

| | | | |
|---|---|---|---|
| 6,622,828 B1* | 9/2003 | DeLeeuw et al. | 188/206 R |
| 6,991,378 B2* | 1/2006 | Jacquemont et al. | 384/471 |
| 2008/0134521 A1* | 6/2008 | Hanada et al. | 30/173 |

FOREIGN PATENT DOCUMENTS

| | | |
|---|---|---|
| JP | A-2006-254785 | 9/2006 |
| JP | A-2006-254786 | 9/2006 |
| JP | A-2008-35821 | 2/2008 |

OTHER PUBLICATIONS

May 24, 2013 Chinese Office Action issued in Chinese Patent Application No. 201080015557.2 (with translation).

Oct. 10, 2012 Chinese Office Action issued in Chinese Application No. 201080015557.2 (with translation).

Nov. 15, 2011 International Preliminary Report on Patentability issued in Application No. PCT/JP2010/051525 (with translation).

\* cited by examiner

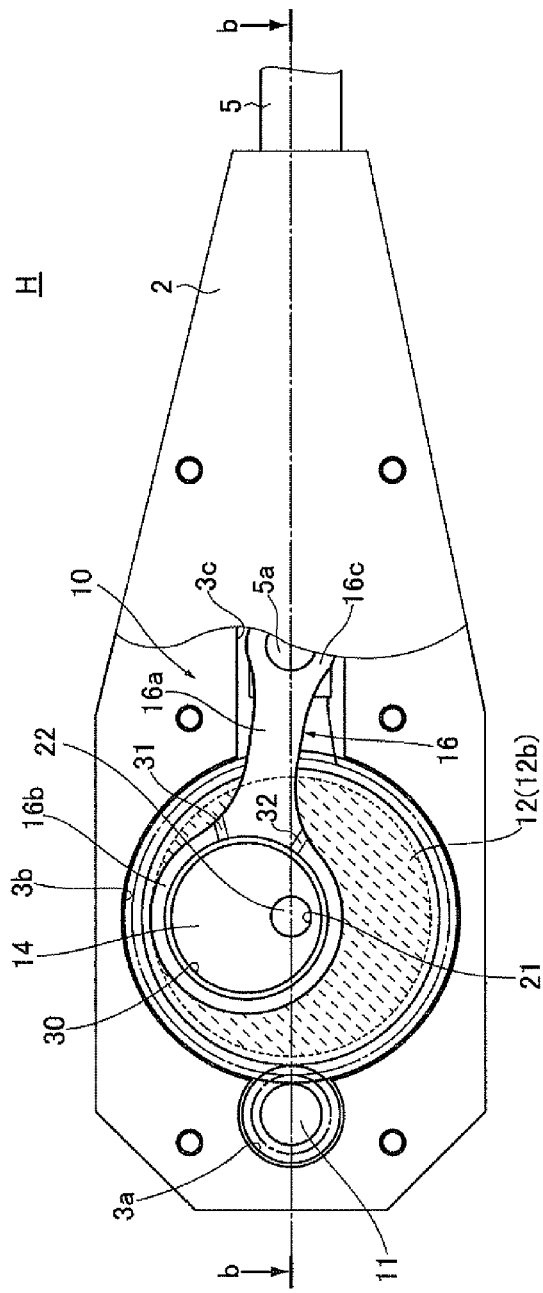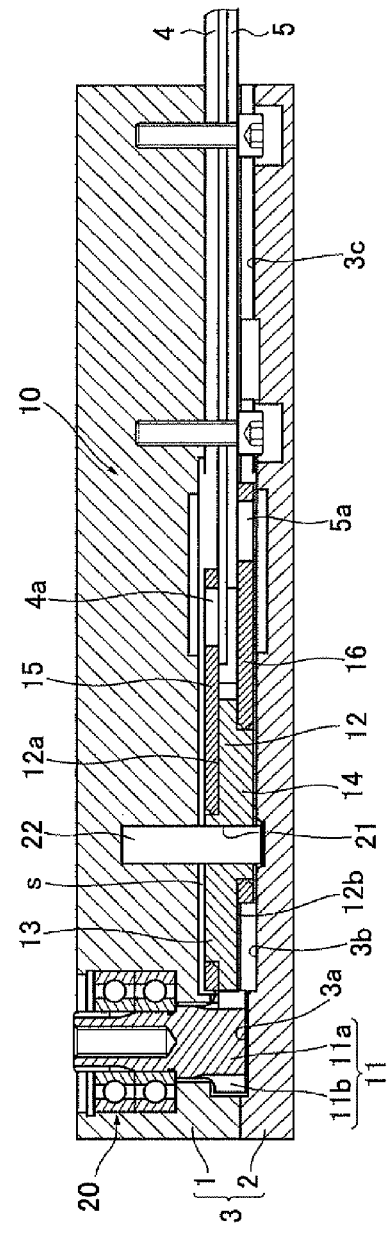
FIG.1A
FIG.1B

LUBRICATION STRUCTURE FOR WORKING DEVICE

TECHNICAL FIELD

The present invention relates to a lubrication structure for a working device in which the torque transmitted from a driving source is converted into the reciprocating linear motion of a blade, as in a handheld working machine typified by a hedge trimmer, a brush cutter and so forth.

BACKGROUND ART

A working device as a hedge trimmer in which a blade linearly moves forward and backward, has a power transmission mechanism that converts the torque transmitted from a driving source to the reciprocating linear motion of a blade. A general power transmission mechanism used in a hedge trimmer has a structure where a gear rotating by the power of a driving source has an eccentric cam, and this eccentric cam is coupled with a blade via a crank member to convert the torque of the gear to the reciprocating linear motion of the blade.

With this power transmission mechanism, an eccentric cam and a crank member slide continuously in contact with one another, and therefore, it is necessary to consistently apply lubricant such as grease to the sliding contact surface. Here, in a working device disclosed in Patent Literature 1, a concave part is formed in a sliding contact surface between an eccentric cam and a crank member, and lubricant supplied to the concave part using pressure fluctuation caused by variations in the capacity of a gear storage chamber.

CITATION LIST

Patent Literature

PLT1: Japanese Patent Application Laid-Open Publication No. 2006-254786

SUMMARY OF INVENTION

Technical Problem

In the above-described lubrication structure, pressure fluctuation can be increased by reducing the capacity of a gear storage chamber. However, when the magnitude of pressure fluctuation excessively increases, the viscosity of lubricant decreases, and therefore the lubricant may flow out of a sliding part in a blade when the pressure rises. In addition, in the above-described lubrication structure, a concave part in communication with the gear storage chamber is formed on part of the sliding contact surface between the eccentric cam and the crank member. Therefore, the amount of lubricant supplied to the sliding contact surface between the eccentric cam and the crank member is not even, that is, the amount of supplied lubricant varies between the part near the concave part and the part away from the concave part. Particularly, when high-viscosity lubricant is used, supply of lubricant is short in part, and this causes abrasion and deterioration to accelerate.

It is therefore an object of the present invention to provide a lubrication structure for a working device that can maintain the lubricating ability for a long period of time by preventing lubricant from flowing out and wasting and by evenly supplying lubricant to the sliding contact surface between an eccentric cam and a crank member, regardless of lubricant used and the use environment.

Solution to Problem

The invention recited in claim 1 is characterized by including: a blade configured to perform predetermined operation; a case in which the blade is supported to be able to move forward and backward; a rotation transmitting part configured to rotate by power of a driving source, the rotation transmitting part being rotatably accommodated in a storage chamber formed in the case; an eccentric cam provided in the rotation transmitting part; and a crank member provided to convert torque of the rotation transmitting part into reciprocating motion of the blade. The crank member includes: a fitting ring part slidably inserted into the eccentric cam; a rod part connected to the fitting ring part, the blade being coupled to the rod part; and a lubricating passageway formed in the fitting ring part. The lubricating passageway divides the storage chamber into a first chamber and a second chamber. The first chamber is formed in one side of the storage chamber with respect to a line connecting between a joint to connect the rod part with the blade and a center of the fitting ring part, and the second chamber is formed in the other side. A capacity of the first chamber decreases due to rotation of the rotation transmitting part while a capacity of the second chamber increases. The lubricating passageway allows communication between the first chamber and the second chamber via a concave part formed in a sliding contact surface between the eccentric cam and the fitting ring part such that lubricating oil contained in the first chamber is introduced into the second chamber.

With the invention recited in claim 1, the blade linearly moves forward and backward to perform predetermined operation, and here, the shape and configuration of the blade, and the operational effect provided by the blade are not limited. In addition, with the invention recited in claim 1, the shape and power transmission structure of the rotation transmitting part are not limited as long as the rotation transmitting part rotates by the power of the driving source. The rotation transmitting part may be a disc-shaped member directly connected to the driving source, or a gear configured to rotate engaging with another gear connected to the driving source.

With the invention recited in claim 1, the crank member may connect between the eccentric cam and the blade and convert the torque of the rotation transmitting part to the reciprocating linear motion of the blade. In this case, the fitting ring part may be provided in one end of the crank member, and the eccentric cam may be slidably inserted into the fitting ring part. In addition, the rod part is connected to the fitting ring part, and therefore the rod part and the blade are connected with one another. Here, a structure in which the rod part is connected with the blade, is not limited. For example, like the structure in which the fitting ring part is connected with the eccentric cam, one end of the rod part may be formed as a ring, and a cylindrical protrusion inserted in the end of the rod part may be provided in the blade to connect the rod part with the blade. Anyway, a structure in which the rod part is connected with the blade, is not limited as long as it is possible to convert the torque of the eccentric cam into the reciprocating linear motion of the blade.

With the invention recited in claim 1, the storage chamber to accommodate the rotation transmitting part is divided into the first chamber and the second chamber by the crank member. When the chamber is divided using a line connecting between a joint to connect the rod part (crank member) with the blade and the center of the eccentric cam, the first chamber is formed in one side of the storage chamber with respect to the line, and the second chamber is formed in the other side. Here, the first chamber and the second chamber may disappear in some instances, depending on changes in the capacity of the storage chamber due to swing of the crank member. In addition, the range of the first chamber or second chamber may be beyond the line depending on the position of the crank member swinging. Moreover, the first chamber and the second chamber are not necessarily separated completely, but may be connected in part.

In addition, the concave part may be provided in the outer surface of the eccentric cam, or may be provided in the inner surface of the inserting hole formed in the fitting ring part into which the eccentric cam is inserted as long as the concave part is located in the sliding contact surface between the eccentric cam and the fitting ring part. Moreover, the lubricating passageway formed in the crank member may be formed in the fitting ring part, or in the rod part. Alternatively, the lubricating passageway may be formed across the fitting ring part and the rod part.

With the invention recited in claim 1, the lubricating passageway may allow communication between the first chamber and the second chamber via the concave part, may be formed as a single passageway, or may branch into the first chamber and the second chamber via the concave part. In addition, the concave part may be formed in the crank member to constantly allow communication between the first chamber and the second chamber, or may be formed in the eccentric cam to allow communication between the first chamber and the second chamber before and after the capacity of the first chamber is minimized.

With the invention recited in claim 2, the lubricating passageway that allows communication between the first chamber and the second chamber includes a first lubricating passageway opening on the first chamber and a second lubricating passageway opening on the second chamber, the first and second lubricating passageways passing through the concave part. With the invention recited in claim 3, the concave part includes an annular groove.

The invention recited in claim 4 is characterized by including: a case in which a blade is supported to be able to move forward and backward, the blade performing predetermined operation; a rotation transmitting part configured to rotate by power of a driving source, the rotation transmitting part being rotatably accommodated in a storage chamber formed in the case; an eccentric cam provided in the rotation transmitting part; and a crank member provided to convert torque of the rotation transmitting part into reciprocating motion of the blade. The crank member includes: a fitting ring part slidably inserted into the eccentric cam; a rod part connected to the fitting ring part, the blade being coupled to the rod part; and a lubricating passageway that allows communication between an annular groove and at least a space in the storage chamber located outside the eccentric cam in a radial direction of the eccentric cam such that lubricating oil contained in the storage chamber is introduced into a concave part. The concave part is formed of the annular groove provided in a sliding contact surface between the eccentric cam and the fitting ring part.

With the invention recited in claim 5, during swing of the crank member, the storage chamber is divided into a first chamber and a second chamber. The first chamber is formed in one side of the storage chamber with respect to a line connecting between a joint to connect the rod part with the blade and a center of the eccentric cam, and the second chamber is formed in the other side. The lubricating passageway includes a first lubricating passageway opening on the first chamber and a second lubricating passageway opening on the second chamber. The first and second lubricating passageways pass through the concave part.

With the invention recited in claim 6, the annular groove is provided in the fitting ring part in the crank member. With the invention recited in claim 7, the eccentric cam passes through from a first surface of the fitting ring part to a second surface, and at least part of the concave part passes through from the first surface of the fitting ring part to the second surface. The first lubricating passageway is formed on the first surface and the second lubricating passageway is formed on the second surface. When the second surface faces the rotation transmitting part, the first lubricating passageway and the first chamber communicate with one another, and the second lubricating passageway and the second chamber communicate with one another and when the first surface faces the rotation transmitting part, the second lubricating passageway and the first chamber communicate with one another, and the first lubricating passageway and the second chamber communicate with one another. With the invention recited in claim 7, the concave part is formed in the fitting ring part in the crank member such that the concave part penetrates both surface of the crank member, and, even if the crank member is inverted and its front and back surfaces are reversed when being mounted, the lubricant contained in the first chamber is introduced into the second chamber via the concave part.

The invention recited in claim 8 further includes a driving gear configured to rotate by power of the driving source, the driving gear being connected to the driving source. The rotation transmitting part includes a driven gear engaging with the driving gear.

Advantageous Effects of Invention

According to the invention recited in claims 1, 2 and 5, the lubricating passageway in communication with the concave part opens on both the first chamber and the second chamber which are separated from one another by the crank member. Therefore, it is possible to efficiently supply lubricant to the concave part. That is, during swing of the crank member, the capacity decreases but the pressure increases in the first chamber, and, on the other hand, the capacity increases but the pressure decreases in the second chamber. As a result of this, the pressure is different between the first chamber and the second chamber. Then, when the pressure increases in the first chamber, the lubricant in the first chamber is discharged to the concave part via the lubricating passageway while the lubricant in the concave part is discharged to the second chamber with a relatively low pressure, via the lubricating passageway. In this way, at the time the lubricant is discharged from the first chamber to the concave part, the lubricant in the concave part is discharged to the second chamber, and therefore the pressure in the concave part is reduced. As a result of this, it is possible to rapidly introduce lubricant into the concave part. In addition, it is possible to prevent the pressure from excessively changing, prevent the temperature of lubricant from excessively rising, and also prevent lubricant from flowing out due to decrease in the viscosity. In particular, according to the invention recited in claims 2 and 5, the lubricating passageway is divided into at least two passageways, and therefore it is possible to prevent the pressure in the first chamber from significantly decreasing and reliably supply lubricant to the concave part.

In particular, according to the invention recited in claims 3 to 8, due to mainly variations in the capacity of the gear storage chamber, the lubricant contained in the gear storage chamber is discharged to an annular groove formed in the sliding contact surface between the eccentric cam and the fitting ring part. By this means, lubricant is evenly supplied to the sliding contact surface between the eccentric cam and the fitting ring part, and therefore it is possible to widely and evenly lubricate the sliding contact surface. Consequently, for example, even if low-viscosity lubricant is used, abrasion and deterioration due to burnout and so forth are not likely to occur.

Particularly, according to the invention recited in claim 6, the annular groove is provided in the fitting ring part in the crank member. Consequently, it is possible to integrally form the annular groove and the lubricating passageway, and therefore reduce the manufacturing cost. In particular, according to the invention recited in claim 7, even if the crank member is inverted and its front and back surfaces are reversed when being mounted, the lubricant contained in the first chamber is introduced into the second chamber via the concave part. This allows the crank member to be reversible, and therefore it is possible to prevent malfunction of the lubricating mechanism due to a mistake made in assembly.

BRIEF DESCRIPTION OF DRAWINGS

FIG. 1A is a bottom view showing a hedge trimmer having a power transmission mechanism according to the present invention; and FIG. 1B is a cross sectional view taken along b-b line shown in FIG. 1A.

DESCRIPTION OF EMBODIMENTS

Figure 2:
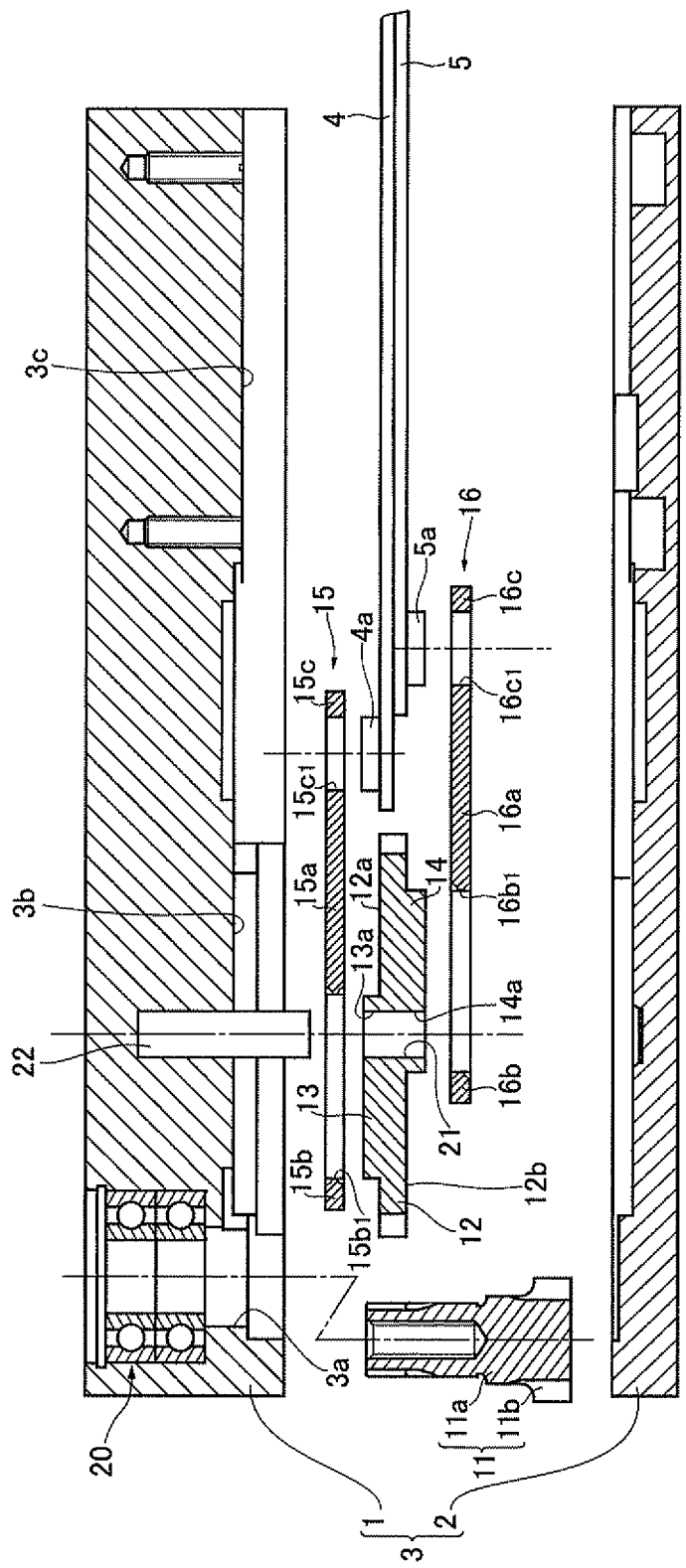
FIG. 2 is a developed view showing parts of a power transmission device.

Now, the first embodiment 1 of the present invention will be described in detail with reference to the drawings. With the present embodiment, a power transmission mechanism according to the present invention is applied to a hedge trimmer that trims branches and leaves. FIG. 1A and FIG. 1B show a bottom view and a cross sectional view showing a hedge trimmer H, respectively. The hedge trimmer H has a case 3 formed by combining a main case 1 and a bottom case 2 with bolts. In the case 3, a driving gear storage chamber 3a, a driven gear storage chamber 3b that is a storage chamber according to the present invention, and a blade storage chamber 3c are formed in series, and store various members.

The blade storage chamber 3c supports a first blade 4 and a second blade 5 to be able to move forward and backward. The first blade 4 and the second blade 5 each have both side surfaces with a number of blades in a longitudinal direction. These blades 4 and 5 repeatedly move forward and backward linearly while facing one another, and alternately go in and out the case 3 to trim branches and leaves. The first blade 4 and the second blade 5 are operated by the power of a driving source such as an engine and an electric motor (not shown) which is fixed to the upper surface of the main case 1. The power of the driving source is transmitted by a power transmission device 10 provided in case 3.

The power transmission device 10 transmits power by converting the torque transmitted from the driving source into the reciprocating linear motion of the first blade 4 and the second blade 5, and includes a driving gear 11, a driven gear 12 that is a rotation transmitting part according to the present invention, eccentric cams 13 and 14, and crank members 15 and 16. As shown in FIG. 2, the driving gear 11 has a shaft part 11a and a tooth part 11b formed on the periphery of the leading edge of the shaft part 11a, and is rotatably supported in the driving gear storage chamber 3a via a bearing 20. This driving gear 11 is connected with an output shaft of the driving source fixed to the upper part above the main case 1 to rotate by the power of the driving source.

Then, the driven gear 12 is rotatably accommodated in the driven gear storage chamber 3b in the case 3. A shaft hole 21 is formed in the center of the driven gear 12, and a rotating shaft 22 is inserted into the shaft hole 21. This rotating shaft 22 is fixed to the case 3, so that the driven gear 12 is rotatably accommodated in the driven gear storage chamber 3b. This driven gear 12 engages with the driving gear 11 to rotate with the driving gear 11, and has a greater diameter than the driving gear 11 to provide deceleration effect in process of the power transmission from the driving gear 11 to the driven gear 12.

In addition, a first eccentric cam 13 is provided on a first surface 12a which is one flat surface of the driven gear 12, and a second eccentric cam 14 which is the same as the first eccentric cam 13 is provided on a second surface 12b opposite to the first surface 12a. Each of the first eccentric cam 13 and the second eccentric cam 14 is formed as a disc and slightly thinner than the driven gear 12. The center of each of the first eccentric cam 13 and the second eccentric cam 14 is located outside the center of the driven gear 12.

Here, the phase of the first eccentric cam 13 is shifted by 180 degrees from that of the second eccentric cam 14 with respect to the rotating direction of the driven gear 12. The first eccentric cam 13 and the second eccentric cam 14 include rotating shaft inserting holes 13a and 14a corresponding to the shaft hole 21 in driven gear 12, respectively, and a rotating shaft 22 pivotally supporting the driven gear 12 is inserted into the rotating shaft inserting holes 13a and 14a. Here, although with the present embodiment, the driven gear 12, the first eccentric cam 13 and the second eccentric cam 14 are integrally formed, these parts may be formed separately.

Then, a first crank member 15 and a second crank member 16 convert the torque of the driven gear 12 into the reciprocating linear motion of the first blade 4 and the second blade 5. The first crank member 15 and the second crank member 16 are made of the same material, and therefore the first crank member 15 will be explained here. The first crank member 15 is made of a thin plate-like metal material and includes a fitting ring part 15b at one end of a rod part 15a. An inserting hole 15b1 into which the first eccentric cam 13 is inserted, is formed in the fitting ring part 15b so as to rotate the first eccentric cam 13 relative to the inserting hole 15b1, and the outer surface of the first eccentric cam 13 faces the inner surface of the inserting hole 15b1 in contact with one another. On the other hand, a small ring part 15c having a smaller diameter than the fitting ring part 15b is provided in the other end of the rod part 15a. An inserting hole 15c1 is formed in this small ring part 15c. A coupling pin 4a provided on the base end of the first blade 4 is inserted into the inserting hole 15c1 so as to rotate relative to the inserting hole 15c1, and the outer surface of the coupling pin 4a faces the inner surface of the inserting hole 16c1 in contact with one another.

In this way, when the driven gear 12 and the first blade 4 are connected with one another via the first crank member 15, the first crank member 15 swings due to the rotation of the driven gear 12 to linearly move the first blade 4 forward and backward. Here, although the first crank member 15 has been explained, the second crank member 16 has a rod part 16a, a fitting ring part 16b and a small ring part 16c like the first crank member 15. Then, the second eccentric cam 14 is inserted into the inserting hole 16b1 in the fitting ring part 16b so as to rotate relative to the inserting hole 16b1. The coupling pin 5a provided in the second blade 5 is inserted into the inserting hole 16c1 in the small ring part 16c so as to rotate relative to the small ring part 16c. In addition, as described above, the first eccentric cam 13 and the second eccentric cam 14 are provided on respective surfaces 12a and 12b of the driven gear 12 such that the phase of the first eccentric cam 13 is shifted by 180 degrees from that of the second eccentric cam 14 with respect to the rotating direction of the driven gear 12. Therefore, the first blade 4 and the second blade 5 always move in the opposite directions such that one goes out the case 3 when the other goes in the case 3. In other words, the first blade 4 and the second blade 5 alternately go in and out the case 3. As a result of this, respective teeth provided on the side surfaces of the blade 4 and the blade 5 engage with each another to provide cutting operation.

In the power transmission device 10 having the above-described configuration, friction occurs in various parts, for example, the sliding contact surface between the crank members 15 and 16 and components, such as the eccentric cam 13 and 14, and the coupling pin 4a and 5a. Therefore, each of the cases 3a to 3c is filled with lubricant such as grease to lubricate each sliding contact part. With the present embodiment, in order to improve the lubricating ability on the sliding contact surface between the first eccentric cam 13 and the first crank member 15 (the inserting hole 15b1), and the sliding contact surface between the second eccentric cam 14 and the second crank member 16 (inserting hole 16b1), the following configuration is adopted for the first crank member 15 and the second crank member 16.

Figure 3:
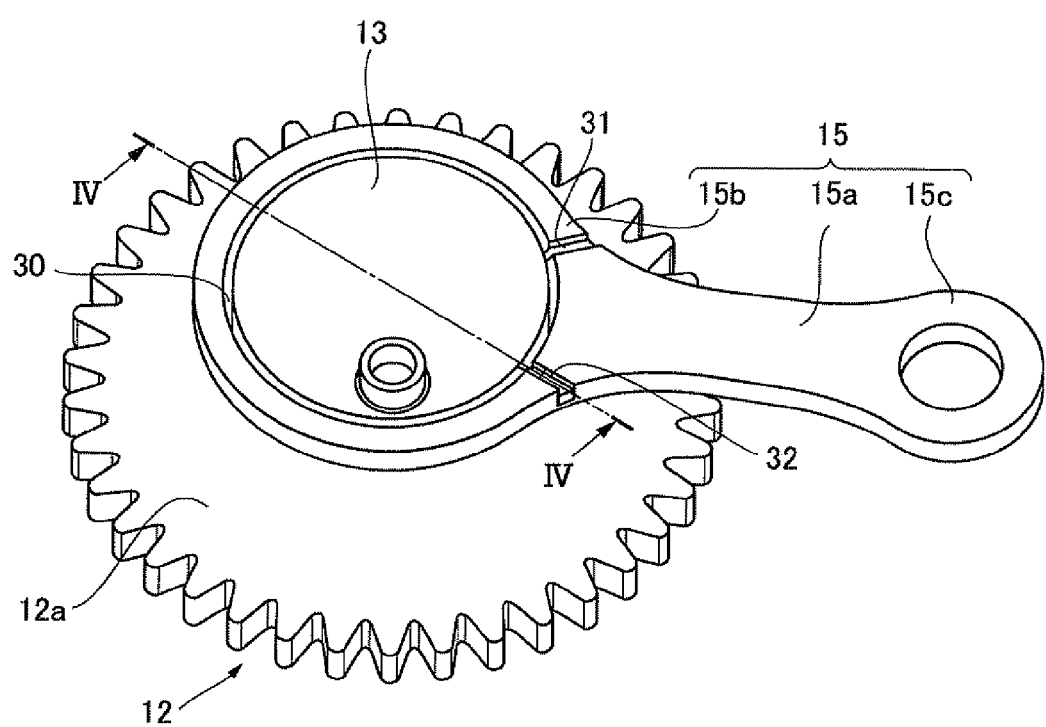
FIG. 3 is a perspective view showing a structure in which a driven gear is connected with a crank member.
Figure 4:
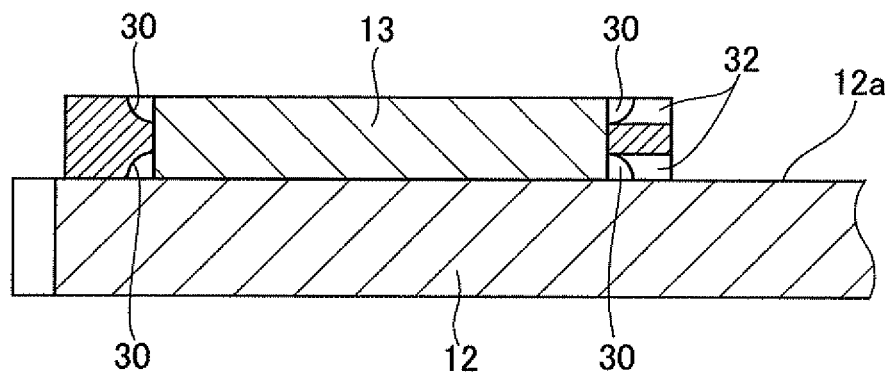
FIG. 4 is a cross sectional view taken along IV-IV line shown in FIG. 3.

FIG. 3 is a perspective view showing a state in which the first eccentric cam 13 is inserted into the fitting ring part 15b (inserting hole 15b1) in the first crank member 15. As shown in the drawing, annular grooves 30 formed as concave parts of the present invention, are formed in the inner surface of the inserting hole 15b1, that is, the sliding contact surface between the first eccentric cam 13 and the inserting hole 15b1 such that each of the annular grooves 30 entirely covers the circumference of the inner surface of the inserting hole 15b1. As shown in FIG. 4, the annular grooves 30 are formed in both surfaces of the first crank member 15 by cutting out the rims of the inner surface of the inserting hole 15b1 (the sliding contact surface between the first eccentric cam 13 and the inserting hole 15b1). The outer surface of the first eccentric cam 13 and the inner surface of the inserting hole 15b1 completely or partly contact one another along the entire circumference at any time. However, in the areas in which the annular grooves 30 are formed, the outer surface of the first eccentric cam 13 and the inner surface of the inserting hole 15b1 are apart from one another and consistently do not contact one another. In this way, the annular groove 30 is formed along the entire circumference of the sliding contact surface between the first eccentric cam 13 and the fitting ring part 15b, so that lubricant can be delivered into the annular grooves 30 to improve the lubricating ability.

In addition, as is clear from FIG. 3 and FIG. 4, a first lubricating passageway 31 and a second lubricating passageway 32 in communication with the annular grooves 30, are formed in the fitting ring part 15b. These lubricating passageways 31 and 32 are formed of concave grooves provided in the flat surface of the fitting ring part 15b, and are provided both surfaces of the first crank member 15 like the above-described annular grooves 30. Here, as shown in FIGS. 5A to 5H, the gear storage chamber 3b includes a chamber 33 formed in the driven gear 12 on the first surface 12a side. The chamber 33 is indicated by slanted lines and defined by the inner wall of the main case 3 and the driven gear 12. In other words, the gear storage chamber 3b is partitioned by the driven gear 12, and consequently the chamber 33 is formed in the driven gear 12 on the first surface 12a side.

In addition, the chamber 33 is divided into a first chamber 33a and a second chamber 33b because of rotation of the first eccentric cam 13 and swing of the first crank member 15 due to the rotation of the driven gear 12, and, in other words, because of changes in the positions of the first eccentric cam 13 and the first crank member 15. To be more specific, when the chamber is divided using a line L (vertical line) connecting between the shaft center of the coupling pin 4a in the first blade 4 and the center of the first eccentric cam 13, where the shaft center of the coupling pin 4a is the joint to connect the first crank member 15 with the first blade 4, the first chamber 33a is formed in one side and the second chamber 33b is formed in the other side with respect to the line L, as shown in FIGS. 5B to 5G.

Figure 5:
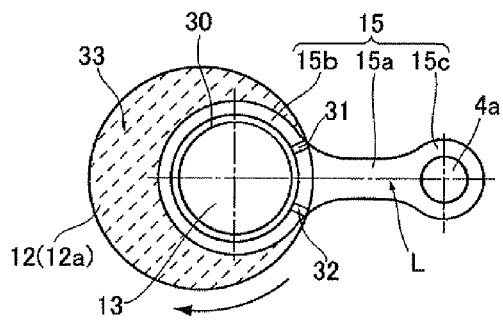
FIG. 5 explains variations in the capacity of a driven gear storage chamber.
Figure 5:
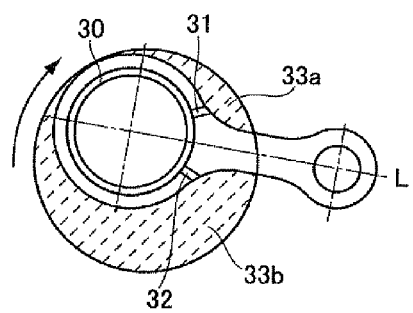
Figure 5:
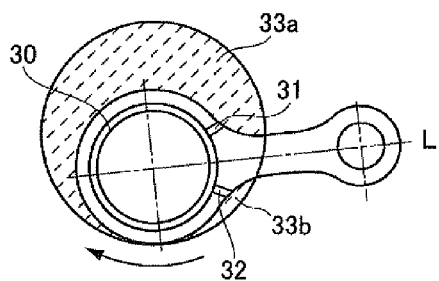
Figure 5:
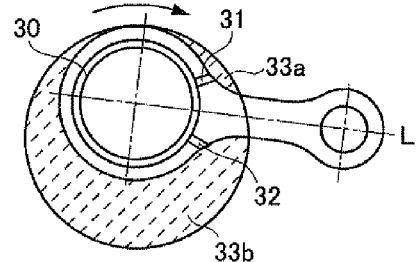
Figure 5:
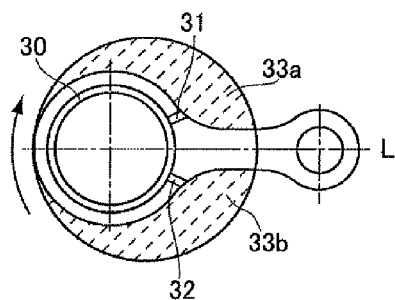
Figure 5:
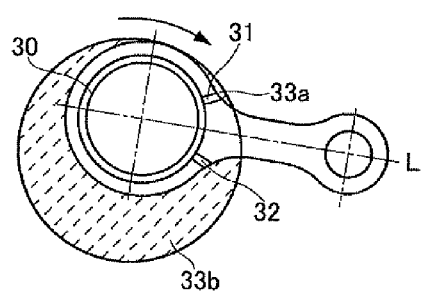
Figure 5:
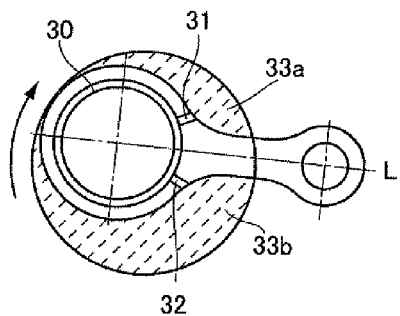
Figure 5:
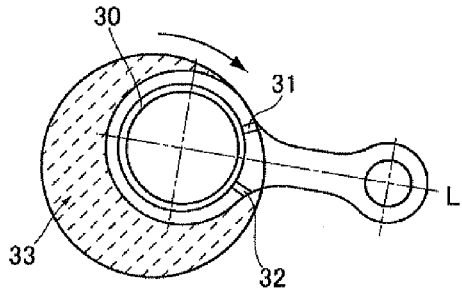

The capacities of the chamber 33a and the chamber 33b vary due to the rotation of the driven gear 12, respectively. To be more specific, the driven gear 12 in a state shown in FIG. 5A rotates in the direction of the arrow shown in the figure, so that the first chamber 33a and the second chamber 33b are formed as shown in FIG. 5B. In this state, part of the first chamber 33a reaches a range beyond the line L, and the capacity of the second chamber 33b is substantially smaller than that of the first chamber 33a. Then, the driven gear 12 further rotates, the capacity of the second chamber 33b gradually increases to place part of the second chamber 33b beyond the line L as shown in FIGS. 5C to 5H. On the other hand, the capacity of the first chamber 33a gradually decreases, and finally disappears as shown in FIG. 5H.

Then, the first lubricating passageway 31 provided in the first crank member 15 opens on the first chamber 33a and allows communication between the first chamber 33a and the annular grooves 30. Meanwhile, the second lubricating passageway 32 opens on the second chamber 33b and allows communication between the second chamber 33b and the annular grooves 30. As described above, the chamber 33 is filled with lubricant such as grease, and therefore the pressure in the first chamber 33a increases when the capacity of the first chamber 33a decreases as mentioned above. The capacity of the first chamber 33a is minimized in the process shown in FIGS. 5F and 5G, and during this period of time, the pressure in the first chamber 33a is maximized.

With the present embodiment, even if the pressure in the first chamber 33a is approximately maximized as shown in FIG. 5G, the first lubricating passageway 31 communicates with the first chamber 33a. In this way, the capacity of the first chamber 33a gradually decreases from the state shown in FIG. 5B to the state shown in FIG. 5H while the pressure in the first chamber 33a gradually increases, so that the lubricant in the first chamber 33a is discharged to the first lubricating passageway 31 due to this increase in the pressure. That is, an increase in the pressure in the first chamber 33a produces pumping action to discharge the lubricant from the first chamber 33a to the annular grooves 30 via the first lubricating passageway 31. By this means, lubricant is supplied to the sliding contact surface between the first eccentric cam 13 and fitting ring part 15b to allow the first eccentric cam 13 and the fitting ring part 15b to move smoothly with respect to one another.

Meanwhile, the capacity of the second chamber 33b gradually increases while the capacity of the first chamber 33a decreases to increase the pressure as described above. By this means, in the second chamber 33b, the increase in the capacity decreases the pressure to create a negative pressure. That is, the pressure in the first chamber 33b increases at the same time as the pressure in the second chamber 33b decreases. Then, the second lubricating passageway 32 communicates with the second chamber 33b, and therefore, lubricant supplied to the annular grooves 30 to lubricate the sliding contact surface between the first eccentric cam 13 and the inserting hole 15b1, is guided to the second chamber 33b via the second lubricating passageway 32. In this way, the annular grooves 30 communicate with the first chamber 33a having a relatively high pressure via the first lubricating passageway 31 while communicating the second chamber 33b having a relatively low pressure via the second lubricating passageway 32. This allows the pressure in the annular grooves 30 to reduce to help to supply lubricant. Here, although a case has been explained where the chamber 33 is formed in the driven gear 12 on the first surface 12a side, even when the chamber 33 is formed in the driven gear 12 on the second surface 12b side, the same operational effect can be produced by changing the positions of the second eccentric cam 14 and the second crank member 16.

As described above, according to the present embodiment, pumping action is produced mainly by a change in the capacity of the driven gear storage chamber 3c to discharge lubricant to the annular grooves 30 formed on the sliding contact surface between the eccentric cams 13 and 14, and the inserting holes 15b1 and 16b1 in the fitting ring parts 15b and 16b. By this mean, lubricant can be evenly supplied to the sliding contact surface, and therefore it is possible to widely and evenly lubricate the sliding contact surface. Hence, abrasion and deterioration due to burnout and so forth are not likely to occur even when, for example, low-viscosity lubricant is used and even when the working machine is used under a low temperature. In addition, the annular grooves 30 communicate with the first chamber 33a and the second chamber 33b at the same time, where the pressure in the first chamber 33a increases due to a change in the capacity while the pressure in the second chamber 33b decreases. This helps circulation of the lubricant guided to the annular grooves 30, and therefore it is possible to improve the lubricating ability.

Here, although with the embodiment, a storage chamber has been explained where a hedge trimmer is used as an example of the working machine to which the lubrication structure of the present invention is applied, it is by no means limiting. Rather, the present invention is widely applicable to working machines configured to be able to convert the torque transmitted from a driving source to reciprocating linear motion. Moreover, with the present embodiment, although the first blade 4 and the second blade 5 linearly move forward and backward at the same time, a single blade hedge trimmer may be adopted where only one blade moves forward and backward. In this case, an eccentric cam for one surface of the driven gear 12 is only required, and a crank member is formed as described above. As a result of this, it is possible to produce the same operational effect as described above.

Figure 6:
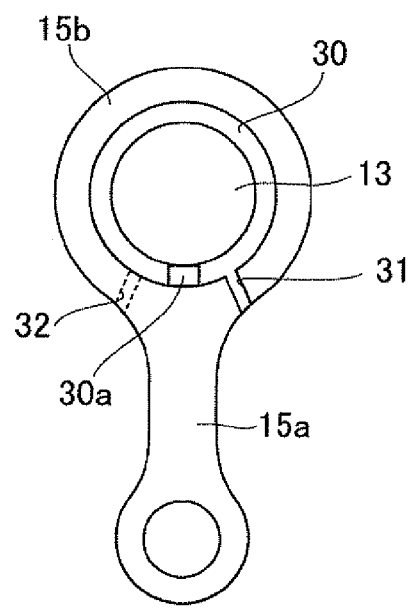
FIG. 6 is a fragmentary plan view showing a crank member according to a second embodiment.
Figure 7:
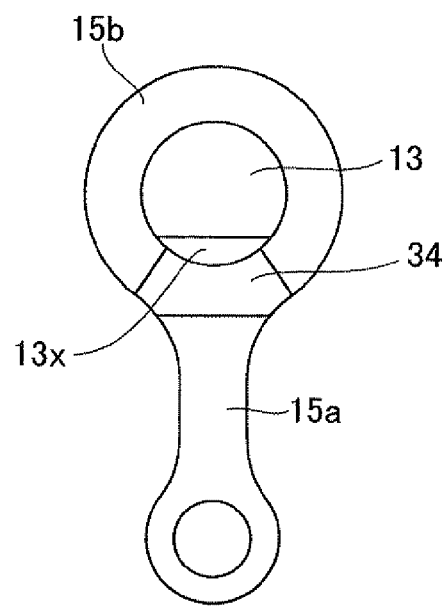
FIG. 7 is a fragmentary plan view showing a crank member according to a third embodiment.

Moreover, with the above-described embodiment, the annular grooves 30 are formed by cutting out the flat surface of the crank member, the annular grooves 30 may be formed, for example, in the middle of the thickness of each of the fitting ring parts 15b and 16b, or may be formed in the eccentric cams 13 and 14 as long as the first chamber 33a and the second chamber 33b communicate with the annular grooves 30 via the first lubricating passageway 31 and the second lubricating passageway 32. In addition, with the above-described embodiment, both the first lubricating passageway 31 and the second lubricating passageway 32 are formed in the surfaces of the fitting ring parts 15b and 16b (crank members 15 and 16). However, as the second embodiment shown in FIG. 6, the first lubricating passageway 31 may be formed in either surface of the fitting ring parts 15b and 16b (crank members 15 and 16) while the second lubricating passageway 32 may be formed in either surface of the fitting ring parts 15b and 16b. In this case, a configuration may be adopted where the eccentric cam 13 passes through from the surface of one of the fitting ring parts 15b and 16b to the surface of the other one, and at least part of the annular grooves 30 passes through from the surface of one of the fitting ring parts 15b and 16b to the surface of the other one by, for example, providing a through hole 30a in the annular grooves 30. This makes the crank members 15 and 16 possible to be reversible, and therefore there is no possible to mount them by mistake.

Here, when a concave groove is formed in the surface of one of the crank members, as the first lubricating passageway 31 communicating with the first chamber 33a with a high pressure, it is preferable to place the concave groove (first lubricating passageway 31) to face the surface of the driven gear. A reason for this is as follows.

As shown in FIG. 1B, the crank member (first crank member 15) contacts the surface of the driven gear (the first surface of the driven gear 12) to prevent changes in the positions and unnecessary vibration due to rotation of the driven gear. Meanwhile, a small gap s is created between the crank member (first crank member 15) and the main case 1 (the inner wall defining the driven gear storage chamber 3b) to prevent the occurrence of friction resistance. If the concave groove formed as the first lubricating passageway 31 communicating with the annular grooves 30 faces the gap s, the lubricant introduced into the first lubricating passageway 31 is not likely to be introduced to the annular grooves 30 but to disperse in the gap s. In contrast with this, when the first lubricating passageway 31 formed of the concave groove faces the surface (first surface 12a) of the driven gear 12, the lubricant introduced into the first lubricating passageway 31 is not likely to flow into the gap s as described above, and therefore it is possible to reliably introduce lubricant into the annular grooves 30. Here, when the gap s is small and the concave groove or annular groove 30 is large, the above-described problem does not occur, and therefore, there is no problem even if the concave groove faces the gap s.

Moreover, although with the above-described embodiments, the lubricating passageway according to the present invention includes the first lubricating passageway 31 and the second lubricating passageway 32, another configuration may be adopted where one lubricating passageway 34 communicates with both the chambers 33a and 33b at a time. Here, with this third embodiment, a concave part 13x, instead of the annular grooves, is formed by cutting out part of the eccentric cam 13, and communicates with both the chambers 33a and 33b. However, the concave part 13x may be naturally replaced with the annular grooves 30.

Here, although with the above-described embodiments, the first lubricating passageway 31 and the second lubricating passageway 32 are placed to be axially symmetric with respect to the line L, this arrangement is by no means limiting. It is preferable to place the first lubricating passageway 31 that allows the annular grooves 30 and the convex part 13x to communicate with the first chamber 33a having a high pressure in the location to communicate with the first chamber 33a at least in a state its capacity is minimized. On the other hand, the location of the second lubricating passageway 32 that allows the annular grooves 30 and the concave part 13x to communicate with the second chamber 33b having a low pressure, is not limited. For example, when the second lubricating passageway 32 is provided in the position to face the first lubricating passageway 31 across the annular grooves 30, that is, in the position 180 degrees apart from the first lubricating passageway 31, the distance between the passageways 31 and 32 are even in the circumferential direction of the annular grooves 30. AS a result of this, it can be expected that lubricant is evenly and fully distributed.

DESCRIPTIONS OF REFERENCE NUMERALS 1 main case
2 bottom surface case
3 case
3a driving gear storage chamber
3b driven gear storage chamber
3c blade storage chamber
4 first blade
4a coupling pin
5 second blade
5a coupling pin
10 power transmission device
11 driving gear
11a shaft part
11b tooth part
12 driven gear
12a first surface
12b second surface
13 first eccentric cam
13a rotating shaft inserting hole
13x concave part
14 second eccentric cam
14a rotating shaft inserting hole
15 first crank member
15a rod part
15b fitting ring part
15b1 inserting hole
15c small ring part
15c1 inserting hole
16 second crank member
16a rod part
16b fitting ring part
16b1 inserting hole
16c small ring part
16c1 inserting hole
20 bearing
21 shaft hole
22 rotating shaft
30 annular groove
31 first lubricating passageway
32 second lubricating passageway
33 chamber
33a first chamber
33b second chamber 34 lubricating passageway
L: line connecting the joint between the blade and the crank member with the center of an eccentric cam
H: hedge trimmer
s: gap formed between the eccentric cam and the main case

The invention claimed is:

1. A lubrication structure for a working machine comprising:
    a case in which a blade is supported to be able to move forward and backward, the blade performing a predetermined operation;
    a rotation transmitting part configured to rotate by power of a driving source, the rotation transmitting part being rotatably accommodated in a storage chamber formed in the case;
    an eccentric cam provided in the rotation transmitting part; and
    a crank member provided to convert torque of the rotation transmitting part into reciprocating motion of the blade, the crank member including:
    a fitting ring part slidably inserted into the eccentric cam an annular concave groove located on an inner surface of the fitting ring part facing the rotation transmitting part and provided in the sliding contact surface of the eccentric cam and the fitting ring part;
    a rod part connected to the fitting ring part, the blade being coupled to the rod part; and
    a lubricating passageway that allows communication between the annular concave groove and at least a space in the storage chamber located outside the eccentric cam in a radial direction of the eccentric cam such that lubricating oil contained in the storage chamber is introduced into a concave part, the concave part being formed in a sliding contact surface between an outer surface of the eccentric cam and an inner surface of the fitting ring part.

2. The lubrication structure for a working machine according to claim 1, wherein:
    during swing of the crank member, the storage chamber is divided into a first chamber and a second chamber, the first chamber being formed in one side of the storage chamber with respect to a line connecting between a joint to connect the rod part with the blade and a center of the eccentric cam, and the second chamber being formed in the other side; and
    the lubricating passageway includes a first lubricating passageway opening on the first chamber and a second lubricating passageway opening on the second chamber, the first and second lubricating passageways passing through the concave part.

* * * * *